(12) United States Patent
Peled et al.

(10) Patent No.: US 7,249,288 B2
(45) Date of Patent: Jul. 24, 2007

(54) METHOD AND APPARATUS FOR NON-INTRUSIVE TRACING

(75) Inventors: Itay Peled, Herzelia (IL); Moshe Anschel, Kfar-Saba (IL); Uri Dayan, Herzelia (IL); Jacob Efrat, Kfar-Saba (IL); Avraham Horn, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 198 days.

(21) Appl. No.: 10/940,252

(22) Filed: Sep. 14, 2004

(65) Prior Publication Data

US 2006/0069952 A1 Mar. 30, 2006

(51) Int. Cl.
*G06F 11/00* (2006.01)
(52) U.S. Cl. .................. 714/47; 714/28; 714/29; 714/45; 717/124; 712/227
(58) Field of Classification Search ............ 714/28, 714/29, 45, 47; 717/124–126; 712/227
See application file for complete search history.

(56) References Cited

U.S. PATENT DOCUMENTS 6,134,676 A 10/2000 VanHuben et al.
6,253,338 B1 6/2001 Smolders
6,615,370 B1 9/2003 Edwards et al.
6,684,348 B1* 1/2004 Edwards et al. ............ 714/45
6,691,207 B2* 2/2004 Litt et al. ................. 711/108
7,007,205 B1* 2/2006 Yeager et al. .............. 714/45
2002/0049893 A1 4/2002 Williams et al.
2006/0069952 A1* 3/2006 Peled et al. ................ 714/25

OTHER PUBLICATIONS

"The Nexus 5001 Forum™ For a Global Embedded Processor Debug Interface," Version 2.0, Dec. 23, 2003, IEEE—Industry Standards and Technology Organization (IEEE/ISTO), pp. i-viii, and 1-157.

* cited by examiner

*Primary Examiner*—Robert Beausoliel, Jr.
*Assistant Examiner*—Emerson Puente (57) ABSTRACT

A method and apparatus non-intrusive tracing. The method includes: counting selected events by multiple counters; sampling the multiple counters to retrieve multiple counter values in response to predefined triggering events; receiving additional trace information that comprises at least one program counter value, and outputting, as a trace information, at least one of the multiple counters values and the additional trace information.

29 Claims, 7 Drawing Sheets

| | | | | | |
|---|---|---|---|---|---|
| TIDCM | | | | | |
| ISEDCA5 | | | | | |
| ISEDCA4 | | | | | |
| ISEDCA3 | | | | | |
| ISEDCA2 | | | | | |
| ISEDCA1 | | | | | |
| ISEDCA0 | | | | | |
| | | TBF | | | |
| EIS | TWBA | DRA | | | |
| DETB | ENCB2 | DRN | | | |
| DECB2 | ENCB1 | DRTB | | | |
| DECB1 | ENCB0 | DRCB2 | | | |
| DECB0 | ENCA2 | DRCB1 | | | |
| ISEDCA2 | ENCA1 | DRCB0 | RPID | RDID | |
| ISEDCA1 | ENCA0 | DRCA2 | | | |
| ISEDCA0 | | DRCA1 | | | |
| | | DRCA0 | | | |
| DP_CR 700 | DP_SR 702 | DP_MR 704 | DP_RPID 706 | DP_RDID 708 | |

METHOD AND APPARATUS FOR NON-INTRUSIVE TRACING

FIELD OF THE INVENTION

The present invention relates to methods and apparatuses for tracing events that occur at a processor-based device and especially for methods and apparatuses systems for non-intrusive tracing.

BACKGROUND OF THE INVENTION

Modern microprocessors are highly complex. They usually include multiple components that are capable of executing multiple tasks at very high speed. Many modern devices usually include one or more processors, controllers and various memory modules, including cache memories.

Various systems and methods are known for extracting information that can reflect that manner in which computerized systems operate. These apparatuses include on-chip debuggers, on chip emulators and the like.

The IEEE-ISTO 5001™ standard, also known as NEXUS defines a standard debug interface for embedded control applications. NEXUS provides a relatively limited amount of de-bugging information but is capable of controlling the processor. The tracked information can be transmitted via dedicated I/O pins or via the JTAG interface, but this is not necessarily so.

The following U.S. patents and U.S. patent application, all incorporated herein by reference, provide an example of some state of the art debugging and emulation apparatuses and methods: U.S. Pat. No. 653,338 of Smolders, titled "System for tracing hardware counters utilizing programmed trace interrupt after each branch instruction or at the end of each code basic block"; U.S. patent application 2002/0049893 of Williams et al., titled "Accessing diagnostic program counter value data within data processing system"; U.S. Pat. No. 6,615,370 of Edwards et al., titled "Circuit for storing trace information", and U.S. Pat. No. 6,134,676 of VanHuben et al., titled "Programmable hardware event monitoring method".

There is a need to provide a large amount of information representing the behavior of complex processor based systems, and especially of providing information about events that are related to each other.

There is a need to provide trace information in addition to information required by known standards, without preventing the provision of standard trace information over standardized interfaces.

SUMMARY OF THE PRESENT INVENTION

The invention allows providing of trace information that can reflect multiple counter values that count selected events. The trace information can include, either instead of said values or in addition to said values additional trace information. The additional trace information includes at least one of the following: a program counter value, a privilege level of a processor and a task ID.

The invention allows sampling a content of one or more counters in response to received additional trace information.

The invention allows providing information relating to events that are associated with the processor as well as information relating to events of components other than the processor.

The invention provides an apparatus for non-intrusive tracing, the apparatus includes: (i) multiple counters, operable to count multiple selected events; (ii) multiple shadow registers, connected to the multiple counters, for sampling the multiple counters in a seamless manner to provide multiple counters values, in response to triggering events; (iii) counters and registers logic, connected to the multiple counters and to the multiple shadow registers, operable to control the operation of the multiple counters and multiple shadow registers; and (iv) trace logic, connected to the multiple shadow registers, adapted to: (i) receive the multiple counters values and receive additional trace information that includes at least one program counter value, and at least one of the following: a processor privilege level indication and a task ID, and (ii) output at least one of the multiple counters values and the additional trace information.

The invention provides a method for non-intrusive tracing, the method including: (i) counting selected events by multiple counters; (ii) sampling the multiple counters to retrieve multiple counter values in response to predefined triggering events; (iii) receiving additional trace information that includes at least one program counter value, a processor privilege level indication and/or a task ID, and (iv) outputting, as a trace information, the multiple counters values or the additional trace information, or both.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
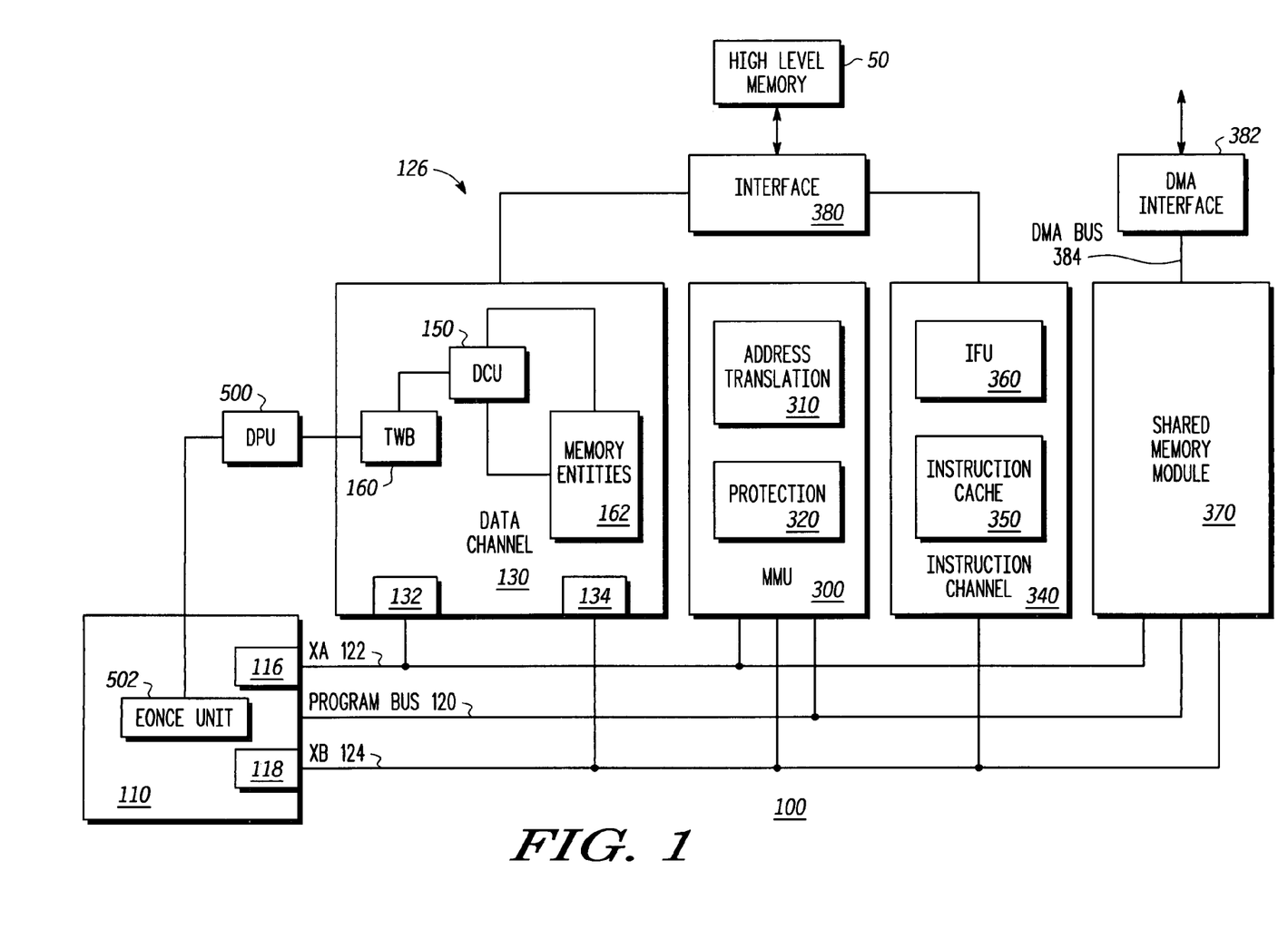
FIG. 1 is a schematic diagram of a system, according to an embodiment of the invention.

FIG. 1 illustrates system 100, according to an embodiment of the invention. The system 100 includes a digital signal processor (referred to as DSP or processor) 110, a data channel 130, a Memory Management Unit (MMU) 300, an instruction channel 340, a level-one RAM memory 370 as well as an interface unit 380.

Processor 110, the instruction channel 340, the shared memory 370 and MMU 300 are connected to a single program bus 120. The instruction channel 340 includes an instruction cache module 350 and an Instruction Fetch Unit (IFU) 360 that is responsible for instruction fetching and pre-fetching for the instruction cache module 350.

DSP 110 has a first data port 116 and a second data port 118. The first data port 116 is connected, via first data bus (XA) 122 to a first port 132 of the data channel 130, to the MMU 300 and to the level-one RAM memory 370. The second data port 118 is connected, via second data bus (XB) 124 to a second port 134 of the data channel 130, to the MMU 300 and to the level-one RAM memory 370. For simplicity of explanation the address buses associated with each of the data and address buses, are not shown.

The data channel 130 is connected via a data fetch bus 126, to an interface 380 that in turn is connected to one or more additional memories such as the high-level memory 50. Additional memories can be a part of a multi-level cache architecture, whereas a data cache module within the data channel is the first level cache module and the other memories are level two caches and/or memories. They can also be a part of an external memory that is also referred to as a main memory.

MMU 300 includes a hardware protection unit 320 for supplying program and data hardware protection, and a translation unit 310 for high-speed virtual address to physical address translation. MMU 330 is also capable of providing various cache and bus control signals. The virtual address is an address that is generated by processor 100 and as viewed by code that is executed by processor 110. The physical address is used to access the various memory banks.

Data channel 130 includes a Trace Write Buffer (TWB) 160, multiple memory entities (collectively denoted 162), such as a cache memory and one or more additional write buffers, and Data Control Unit (DCU) 150 that arbitrates between bus requests of the TWB 160 and other memory entities 162. DCU 150 can apply various well-known arbitration schemes. Conveniently, the DCU 150 arbitrates between various bus requests according to predefined priorities. TWB 160 usually issues low-priority bus requests from the TWB 160 but in some cases can issue high-priority bus requests as well.

Figure 2:
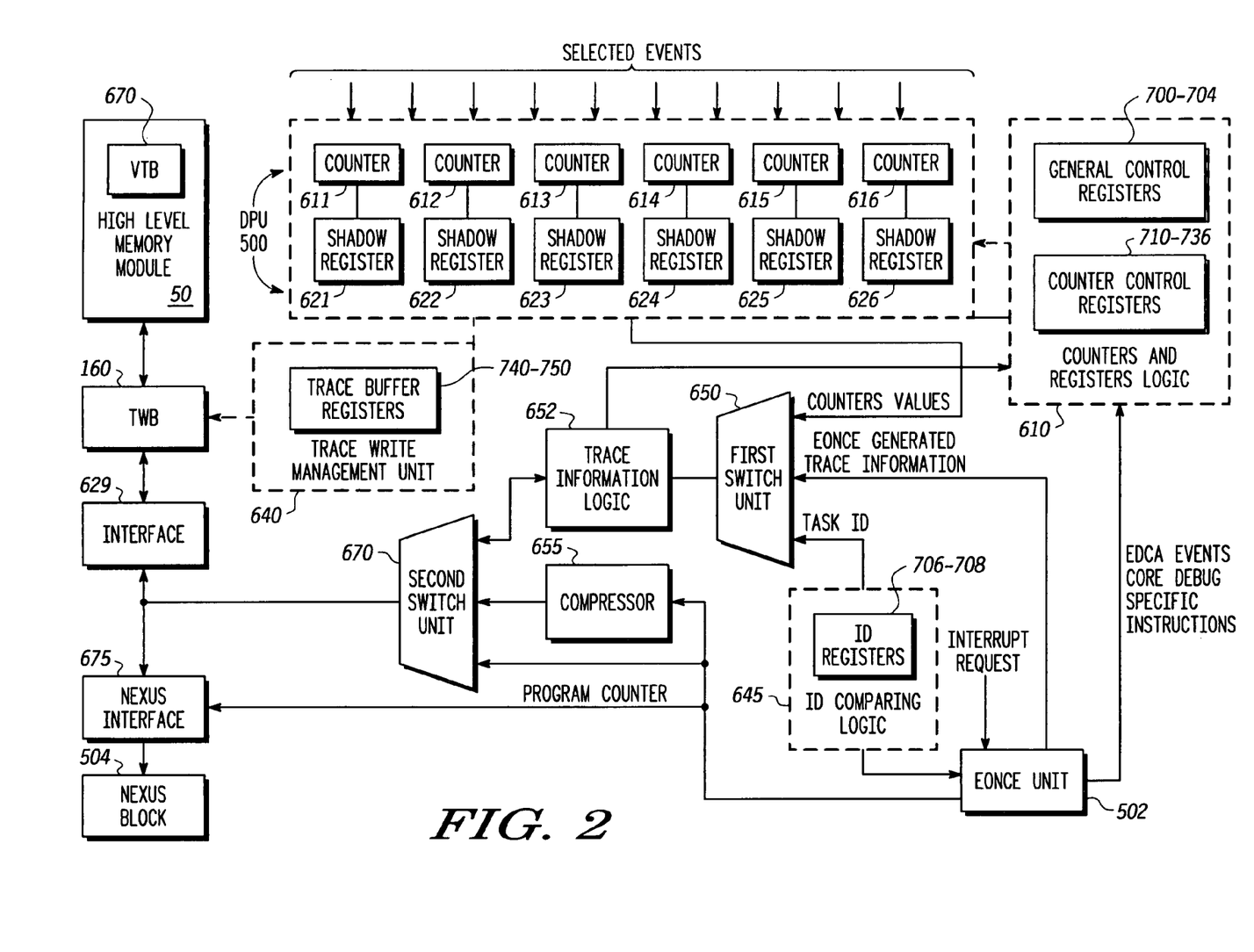
FIG. 2 is a schematic description of a debugging and profiling unit, according to an embodiment of the invention.

FIG. 2 is a schematic description of a debugging and profiling unit (DPU) 500, according to an embodiment of the invention.

DPU 500 includes multiple counters, such as counters 611–616 that are arranged in two sets of three counters each, multiple shadow registers 621–626, counters and registers logic 610, ID comparing logic 645, NEXUS interface 675, interface 629 and multiple trace logic units such as trace write management unit 640, first switch unit 650, compressor 655, second switch unit 670, and trace information logic 652. DPU 500 is connected to the on chip emulator unit (also referred to EOnCE) unit 502, to a high-level trace information component, such as NEXUS block 504 and to a TWB 160. According to other embodiments of the invention the trace logic can include at least one out of the ID comparing logic 645, NEXUS interface 675, interface 629, additional units or less units than previously mentioned.

On chip emulation units, such as the EOnCE unit 502, are known in the art. The EOnCE unit 502 is described at chapter 4 of the SC140e™ DSP Core Reference Manual, which is incorporated herein by reference.

EOnCE unit 502 permits a certain amount of access to various registers, program counters (PC) and the like. It interfaces with a JTAG interface unit to provide JTAG compliant signals (test data input TDI, test data output TDO, test clock input TCK, test mode select input TMS and test reset TRST).

Briefly, EOnCE unit 502 includes an EOnCE controller, an event counter, a trace unit, an event detection unit, an event selector and a synchronizing unit. The event detection unit include six address event detection channels EDCA5-EDCA0, each capable of detecting an appearance of a certain address (or of an address that belongs to a certain address range) at the address lines associated with either the first or second data buses XA 122 and XB 124.

The EOnCE unit 502 can operate in various modes of operation, and to trace various events, including: (i) TEX-EXT—trace the PC of each execution set, (ii) TMARK—tracing the PC of execution sets that includes the MARK instruction, (iii) TCHOF—tracing the source and destination PC of an execution set that includes a predefined change of flow instruction, (iv) TLOOP—tracing the execution of hardware loops, whereas for long loops the PC of the last address and start address are traced and for short loops only the PC of the last address is traced, (v) TSUB—trace the source and destination PC of execution sets that include subroutine call or return instructions, (vi) TRTE—trace the source and destination PC of execution sets that include return from exception instructions, and (vii) TINT—trace the interrupt point and destination PC of interrupts and exceptions. In addition, upon a trace event a counter value and an extension counter value can be traced.

In general, once a change of flow occurs the EOnCE unit 502 can provide one or more program counter values as well as a task flag that reflects the privilege level of the processor.

Counters and registers logic 610 includes multiple control registers, such as control registers 710–736, for determining which events will be counted by the counters 611–616, which events will cause the shadow registers 621–626 to sample the counters 611–616 in a non-intrusive manner.

Each counter out of counters 611–616 is a 31-bit down count register that can operate at a one-shot counting mode and at a trace mode. In the former mode a counter counts from a certain programmed value to zero and then creates an event and stop counting. This event can cause processor 110 to enter a debug mode, can trigger a debug exception or debug interrupt. In the latter mode a counter keeps counting, reaches zero, wraps around and continues to count. The content of counters 611–616 is read by the shadow registers 621–626 upon a trace event.

DPU 500 is capable of writing trace information, either generated by the EOnCE or generated by the DPU 500 to a virtual trace buffer (VTB) 670 via the TWB 160. It is also able to write trace information to an external NEXUS block 504.

The VTB 670 is conveniently a memory space within the high-level memory module 50 that is defined by a start address, and an end address that are stored at various control registers, that are illustrated later on. The control registers also holds a pointer pointing to a current memory entry that should receive trace information.

The trace write management unit 640 controls the writing process of the trace information to the VTB 670. The trace information can be written from the VTB 670 in three possible modes. When operating at a overwrite mode, trace write address wrap to the start address, and the trace data overwrites older data. This tracing mode enables to view the trace information leading to a breakpoint or error point. When operating at one-address mode, trace information is written to a single programmable address. This allows writing the trace information to a peripheral device such as a serial interface unit. When operating at a trace event request mode the information in the VTB 670 could be read in a periodical manner, once the VTB 670 is filled. The DPU 500 can generate an interrupt that activates a read operation of the VTB 670, for example by a DMA.

The trace information may include DPU generated trace information (such as the content of the six registers 611–616), EOnCE unit generated trace information and compressed EOnCE unit generated trace information. The first and second switches 650 and 670 receive control information for selecting which information to output. According to an embodiment of the invention the trace information can include a combination or these information. According to another embodiment of the invention the VTB 670 can receive certain trace information while the NEXUS block 504 receives other trace information. This separation can be utilized by simple known in the art logic components.

EOnCE unit generated information is compressed by a compression unit 655 that can apply either the mentioned below compression scheme or various well-known compression schemes. According to an embodiment of the invention the compressor compresses the EOnCE unit generated trace information by removing redundant loop information. For example, if the trace information reflects an occurrence of a short hardware loop only the last address of the loop and the number of time the loop was executed are written. If the trace information reflects an occurrence of a long hardware or software loop only the last address of the loop or the start address of the loop as well as the number of time the loop was executed are written. The DPU marks the occurrence of a short hardware loop by a short loop flag, while the occurrence of a long software or hardware loop is indicated by a long loop flag.

TWB 160 is eight 256-bit entries deep. When TWB 160 is full it sends high-priority bus requests to the DCU 150, else it sends low priority bus requests to the DCU 150.

The access to the VTB 670, as well as the flow of trace information to the TWB 160 and then to the VTB 670 can be controlled by control signals determining the amount and type of information that is to be traced.

The trace information can include multiple trace flags. Each trace flag has a unique value that cannot be interpreted as other trace information, such as the program address. The trace flags, except a dummy flag, indicate the type of trace information. The trace flags include a user task flag, a supervisor task flag, a short loop flag, a long loop flag, a VTB fill flag and a dummy flag.

There are two task flags—a user task flag and a supervisor task flag. Thus the task flag reflects the privilege level of the task. A user task flag indicates that the processor operates at a user privilege level and also includes the task ID.

A supervisor task flag indicates that the processor operates at a supervisor privilege level. The VTB dummy and fill flags are used for TWB padding and do not convey trace information.

TABLE 1 illustrates exemplary flags formats, according to an embodiment of the invention. The value of X for bit 0 means that it can be 0 or 1, depending on the context where this flag is used (see Table 2).

TABLE 1

| Flag name | Bits 31–20 | Bits 19–17 | Bits 16–1 | Bit 0 |
|---|---|---|---|---|
| User task flag | DPU base address | 000 | task ID | X |
| Supervisor task flag | DPU base address | 001 | 16'h0 | X |
| Short loop flag | DPU base address | 010 | 16'h1 | 0 |
| Long loop flag | DPU base address | 010 | 16'h2 | 0 |
| VTB fill flag | DPU base address | 010 | 16'hFFFF | 1 |
| Dummy flag | DPU base address | 010 | 16'h0 | 0 |

The DPU base address is a unique address that cannot be interpreted as a program counter value.

At the first mode of operation when a task switch occurs the DPU 500 can save the following information: the last PC of the former task, the value of counters 611–616, the first PC of the new task as well as the task flag of the new task. The EOnCE unit 502 shall be programmed to trace interrupts and RTE instructions together. The task flag includes an indication about the privilege level of the processor.

At a second mode of operation the DPU 500 saves information when the processor jumps to or returns from a subroutine or an interrupt routine. Once such an event occurs the EOnCE unit 502 sends the DPU 500 a source PC and a destination PC. Once such a pair is received the DPU 500 samples the following information: the last PC before jumping to or returning from a subroutine or an interrupt routine, the value of counters 611–616, the task flag and first PC after the change of flow. The EOnCE unit 502 is programmed to trace the following change of flow instructions: jump to an interrupt routine, return from an interrupt service routine, jump to a subroutine and return from a subroutine.

At a third mode of operation the DPU 500 saves the following information when the SAMPLE bit in PD_TC 740 is set: the task flag, the value of counters 611–616, and the dummy flag to ensure that the size of each trace message is 256 bits. Once the first information portion are sent to the TWB 160 the SAMPLE bit is reset.

At a fourth mode of operation the DPU 500 saves information when an address event detection channel EDCA5 of the EOnCE generates an event, which could be any kind of breakpoint detected by this unit. The following information is saved: the task flag, the value of counters 611–616 and the dummy flag.

At a fifth mode of operation once a write access is executed to a trace data register (denoted DP_TD 750 in FIG. 5) then its content is written to the WTB 160.

The trace information is written to the TWB 160 in a certain format. A trace entry is any number of writes from DPU 500 that are generated as a result of a single tracing event. A trace entry includes at least one of the mentioned above flags and conveniently has a format that is illustrated at TABLE 2. Those of skill in the art will appreciate that other formats can be used.

TABLE 2

| Trace entry | Format | LSB | Flag value | Used in tracing modes |
|---|---|---|---|---|
| Task switch entry to supervisor | <source PC> <flag> <destination PC> | 1 0 0 | Supervisor task flag | Compression mode |
| Task switch entry to user | <source PC> <flag> <destination PC> | 1 0 0 | User task flag | Compression mode |
| Counter trace entry, task switch mode | <source PC> 6 counters values <flag> <destination PC> | 1 0 0 0 | Same as task switch entry (to user or supervisor) | Counter trace mode |
| Counter trace entry, interrupt/ subroutine mode | <source PC> 6 counters values <flag> <destination PC> | 1 0 0 0 | Same as task switch entry (to user or supervisor, depending on privilege level of the destination PC) | Counter trace mode |
| Counter trace entry, software request or EDCA5 event trigger | <flag> 6 counters values | 1 0 | Same as task switch entry (to user or supervisor) with LSB 1 | Counter trace mode |

TABLE 2-continued

| Trace entry | Format | LSB | Flag value | Used in tracing modes |
|---|---|---|---|---|
| Short loop compressed entry | <source PC><br><flag><br><Iteration count> | 1<br>0<br>0 | Short loop flag | Compression mode |
| Long or software loop compressed entry | <source PC><br><destination PC><br><flag><br><iteration count> | 1<br>0<br>0<br>0 | Long loop flag | Compression mode |
| Dummy trace | <flag> | 1 | Dummy flag | All modes |

According to the mentioned above format the first trace information to be written to the TWB 160 is characterized by an LSB value of one, followed by the additional trace information that is characterized by an LSB values of zero. This eases parsing of the trace information.

DPU 500 includes multiple control registers. Most of these control registers belong to the counters and registers logic 610, but some belong to the trace write management unit 640 and to the ID comparing logic 645. These registers include general control registers, counter control registers and trace buffer registers.

The trace information logic 652 is connected to the first switch unit 650, receives trace information from the EOnCE unit 502, compares at least some of that information to predefined (usually programmed) values, and may initiate one or more triggering event in response to said portion. The trace information logic 652 is connected to the counters and registers logic 610 to provide an indication about an occurrence of one or more triggering events.

Figure 3:
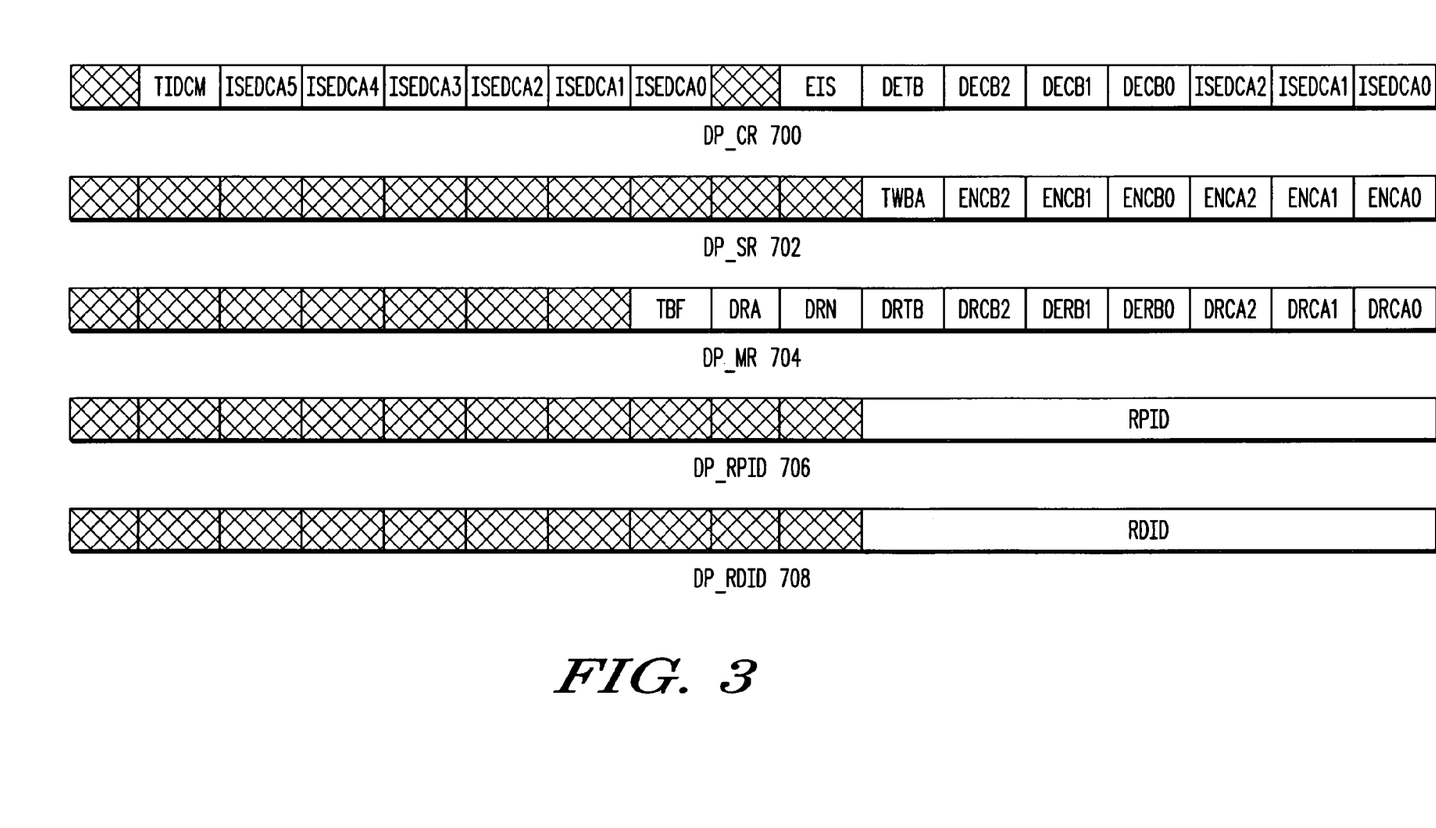
FIGS. 3–5 illustrate various control registers, according to an embodiment of the invention.

FIG. 3 illustrates various general control registers, according to an embodiment of the invention. The general control registers include a control register (DP_CR) 700, a status register (DP_SR) 702, a monitor register (DP_MR) 704 a PID detection reference value register (DP_RPID) 706 and a DID detection reference value register (DP_RDID) 708.

The control register (DP_CR) 700 includes two ID compare bits (TIDCM—bits 29-28) that define if data task ID and/or Instruction task ID or neither of them are taken into account by the ID comparing logic 645.

Some bits (bits 27-14) indicate whether various EOnCE generated events (ISEDACA5-ISEDACA0, bits 27-16), EOnCE generated interrupt requests (EIS, bit 14), can cause zero, one or two interrupt requests to a Program Interrupt Controller (PIC) (not shown).

The remaining bits (bits 13-0) of DP_CR 70 indicate whether an interrupt request is sent to the PIC or to a debug request to the EOnCE unit 402, in response to counter generated events (DECB2-DECA0, bits 11-0) or trace related events (DETB, bits 13-12).

The status register (DP_SR) 702 includes a trace buffer active bit (TWBA, bit 6) indicative if there is any trace information within TWB 160 that did not reach the VTB 670), and six counter enable bits (ENCB2-ENCA0, bits 5-0) each indicating if a respective counter is enabled or disabled.

The monitor register (DP_MR) 704 includes a trace buffer full bit (TBF, bit 9), indicating that TWB 160 is full, and multiple bits (DRA, DRN, DRTB, DRCB2-DRCA0) that indicate a reason for an existing debug request or interrupt.

The reason may be an external debug request, a NEXUS debug request, a trace event, or an event associated with one of the six counters.

The PID detection reference value register (DP_RPID) 706 includes an 8-bit reference program ID value (RPID, bits 7-0) to be compared by the ID comparing logic 645.

The DID detection reference value register (DP_RDID) 708 includes an 8-bit reference data ID value (RDID, bits 7-0) to be compared by the ID comparing logic 645.

Figure 4:
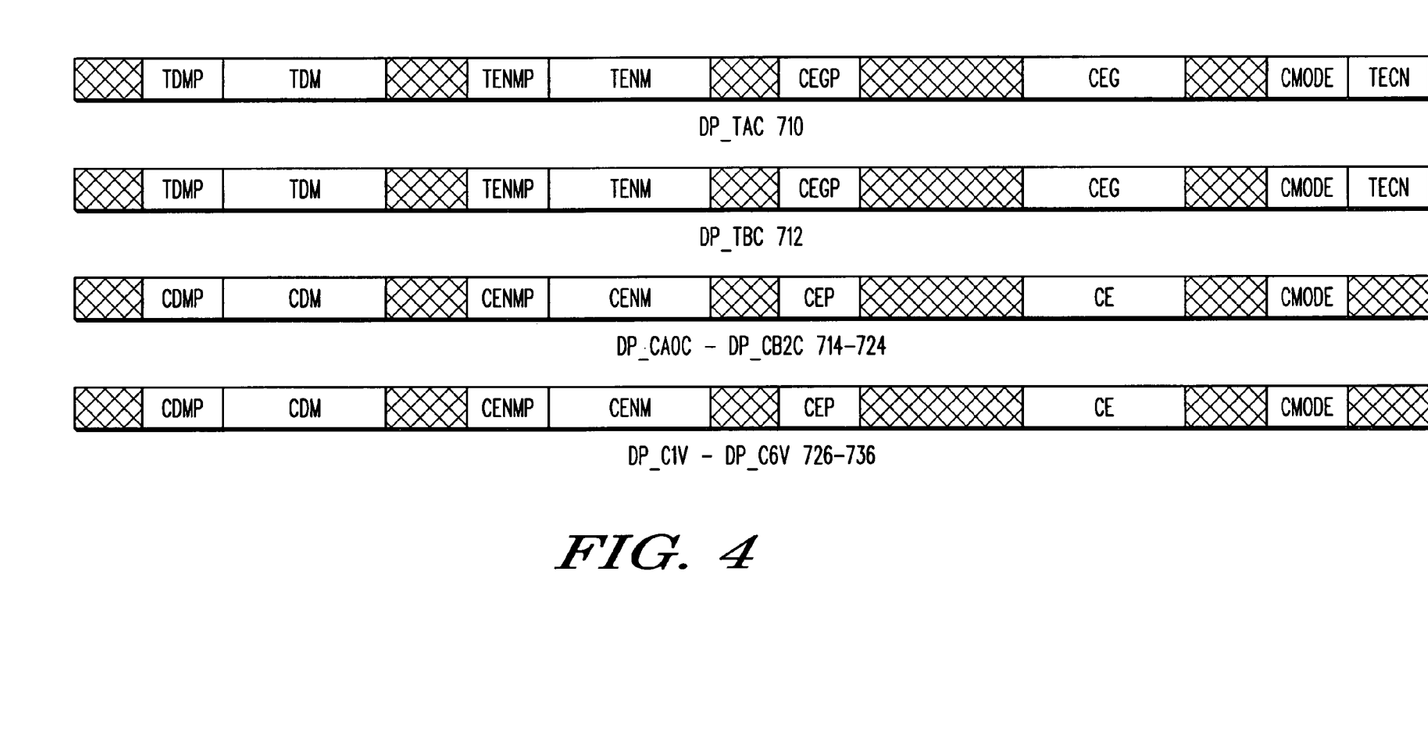

FIG. 4 illustrates some counter control registers, according to an embodiment of the invention. The counter control registers include a first counter set register (DP_TAC) 710, a second counter set register (DP_TBC) 712, first till sixth counter control registers (DP_C1-DP_C6) 714–724, and first till sixth counter value registers (DP_C1-DP_C6) 726–736.

The first counter set register (DP_TAC) 710 includes a set disable mode privilege level bits (TDMP, bits 29-28) that determines the privilege level (user or supervisor) in addition to an optionally required ID value that can disable the counters of the set. DP_TAC further includes bits for specifying the event that disables the set of registers bits (TDM, bits 27-24) and especially which EDCA is associated with the event that can disable the counter set.

In addition to the previously mentioned bits, DP_TAC also includes a register set mode privilege bits (TENMP, bits 21-20) that defines the privilege level of events that can enable the counters (also termed trace events), an event that enables the set of registers bits (TENM, bits 19-16) and counted event group privilege level bits (CEGP, bits 13-12) that define the privilege level of tasks that include the traced events. These bits are followed by counter event group bits (CEG, bits 8-4) that represent which set of trace events is being counted, counter set mode register bits (CMODE, bits 2-1) that define if the set of counters operate at one-shot counting mode or at trace mode, and finally a TCEN bit (bit 0) that determines if the registers are individually controlled or are subjected to set control.

The second counter set register (DP_TBC) 712 is identical to the first counter set register 710, but controls the second set of counters 614–616.

Each of the six counter control registers (DP_C1-DP_C6) 714–724 is similar to the counter set register DP_TAC, but is controls a single counter and not a set of registers. The least significant bit is disabled.

Each of the six counter value registers (DP_C1-DP_C6) 726–736 holds the 31-bit counter value of each of the six counters, that serves as the initial count value and the ongoing count value after activation.

Figure 5:
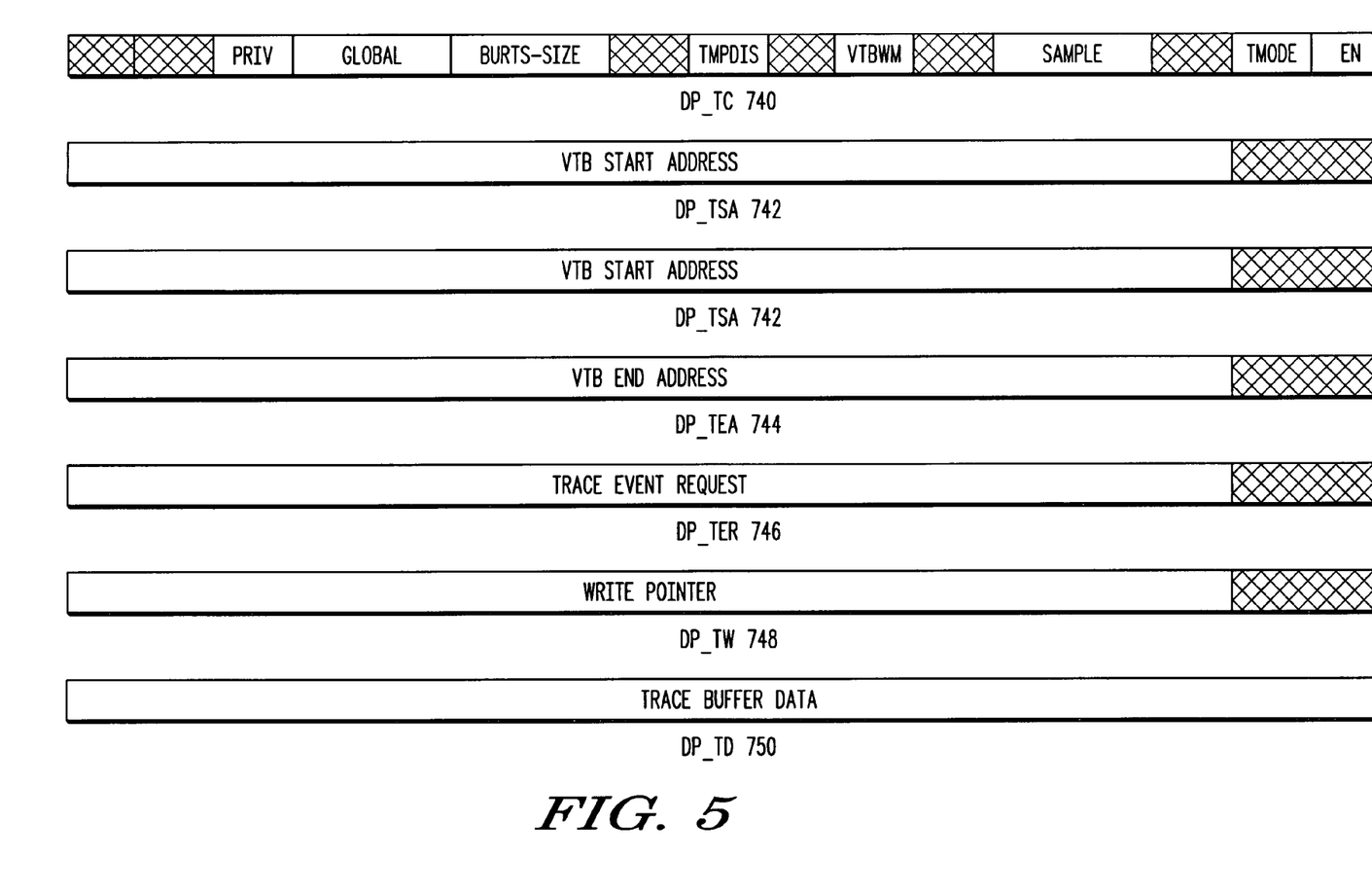

FIG. 5 illustrates various trace unit registers, such as: a trace control register (DP_TC) 740, a VTB start address register (DP_TSA) 742, a VTB end address register (DP_TSA) 744, a trace event request register (DP_TER) 746, a trace write pointer register (DP_TW) 748, and trace data register (DP_TD) 750.

The trace control register (DP_TC) 740 includes a privilege bit (PROV, bit 21) indicative of the privilege of the VTB write access. DP_TC 740 also includes global operation attribute (GLOBAL, bits 20-19, burst size bits (BURSTSIZE, bits 17-16) indicating the burst size of a write operation to the VTB 670 (usually either one, two four or eight BDUs), and temporal disable bits (TMPDIS, bit 12), for allowing to flush the content of the TWB 160 in order to verify that all the trace information arrived to the VTB 670. DP_TC 740 further includes virtual trace buffer write mode bits (VTBWM, bits 9-8) indicating if the trace information shall be written in overwrite mode, one address mode or trace event request mode. These bits are followed by a sample counter values to the VTB bit (SAMPLE, bit 6) and trace mode bits (TMODE, bits 4-1) indicating the trace information that is being outputted, such as EOnCE generated trace information, compressed EOnCE generated trace information (and also added task flags), the values of the six counters with additional trace information. The least significant bit of DP_TC 740 is an enable bit (EN) indicating if the tracing is enabled.

The VTB start address register (DP_TSA) 742 stores a 32-bit physical address of the beginning of the virtual trace buffer 760. The VTB end address register (DP_TSA) 744 stores a 32-bit physical address of the end of the virtual trace buffer 760. The trace event request register (DP_TER) 746 stores a 32-bit address within the VTB 670 where an interrupt or debug request should be generated. This address is written when the DPU 500 operates as a trace event request event mode. The trace write pointer register (DP_TW) 748 stores a 32-pointer to a WTB 670 entry where the current trace information is being written. The trace data register (DP_TD) 750 stores data that should be written to the VTB 670 at a certain mode of operation.

Conveniently, a set of counters can be set to track a set of events. TABLE 3 illustrates various sets of events that are tracked by asset of three registers.

TABLE 3

| Set of events name | Event counted by the first counter | Event counted by the second counter | Event counted by the third counter |
|---|---|---|---|
| Instruction cache hit-miss | Instruction cache miss events | Instruction cache hit events | Instruction cache pre-fetch hit events |
| Data cache hit-miss | Data cache miss events | Data cache hit events | Data cache pre-fetch hit events |
| Data cache thrash | Data cache thrashes due to cache miss events | Data cache thrashes due to sweeps | X |
| Processor stall rate, wait | Clock cycles | Wait processing state cycles | Processor stall cycles |
| Processor stall basic division | Processor stall cycles due to instruction cache | Processor stall cycles due to data cache | Processor stall cycle due to higher-level memory module |
| Processor stall due to the instruction cache | Processor stall cycles due to cacheable miss accesses to the instruction cache | Processor stall cycles due to non-cacheable miss accesses to the instruction cache | Processor stall cycles due to instruction cache contention |
| Processor stall due to the data cache | Processor stall cycles due to cacheable miss accesses to the data cache | Processor stall cycles due to non-cacheable miss accesses to the data cache | Processor stall cycles due to data cache contention |
| Processor stall due to the cache Write Through Buffer | Processor stall cycles due to contentions in the cache Write Through Buffer | Processor stall cycles due to fullness of the cache Write Through Buffer | Processor stall cycles due to sequential write freeze |
| Processor stall due to the high-level memory module (HLMM) | Processor stall cycles due to contentions in the HLMM | Processor stall cycles due to program - data contentions | Processor stall cycles due to data - data contentions |
| Interface instruction bus load | Clock cycles | Clock when the bus is waiting for service | Clock when the bus is busy |
| Interface data bus load | Clock cycles | Clock when the bus is waiting for service | Clock when the bus is busy |
| Interface data bus load due to writing to the VTB | Clock cycles | Clock when the bus is waiting for service due to the write to the VTB | Clock when the bus is busy due to the write to the VTB |
| VTB write processor stall | Clock cycles | Processor stall cycles due to the write to the VTB | Processor stall cycles |
| DMA interface lock stall rate | Clock cycles | Processor stall cycles due to the write to the DMA interface lock. | Processor stall cycles |

Figure 6:
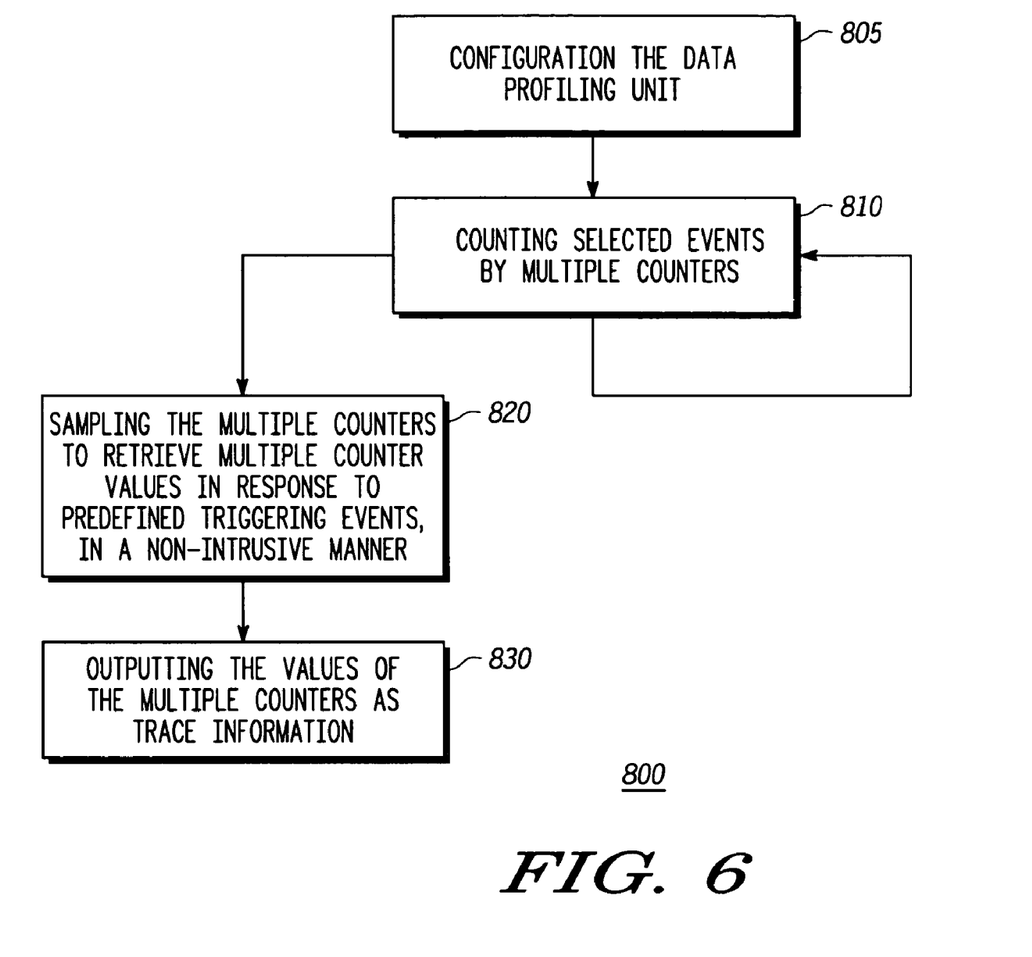
FIGS. 6–7 are flow charts of methods for non-intrusive tracing, according to embodiments of the invention.

FIG. 6 is a flow chart of a method 800 for non-intrusive tracing, according to an embodiment of the invention. Method 800 starts by stage 810 of counting selected events by multiple counters. Referring to the example set forth in FIG. 2, the counters and registers logic 610 determines which trace events are counted by the counting registers 611–616. The determination is responsive to the content of various control registers, that can facilitated a control of each counter individually or even facilitate control on a set of events basis. The control registers can be configured during a preliminary configuration stage 805. The arrow from box 810 to itself indicates that the counting of event proceeds while method 800 proceeds to stages 820 and 830.

Method 800 further includes stage 820 of sampling the multiple counters to retrieve multiple counter values in response to predefined triggering events, in a non-intrusive manner. Referring to the example set forth in FIG. 2, the shadow registers 621–626 are adapted to sample the content of the counters 611–616 upon a reception of triggering events. The triggering events are predefined, especially using various control registers. Each shadow register can perform a sampling operation regardless of the other shadow registers.

Stage 820 is followed by stage 830 of outputting the multiple counters values as trace information. Referring to the example set in previous FIGs, the interface 645 is capable of outputting trace information in various manners.

Figure 7:
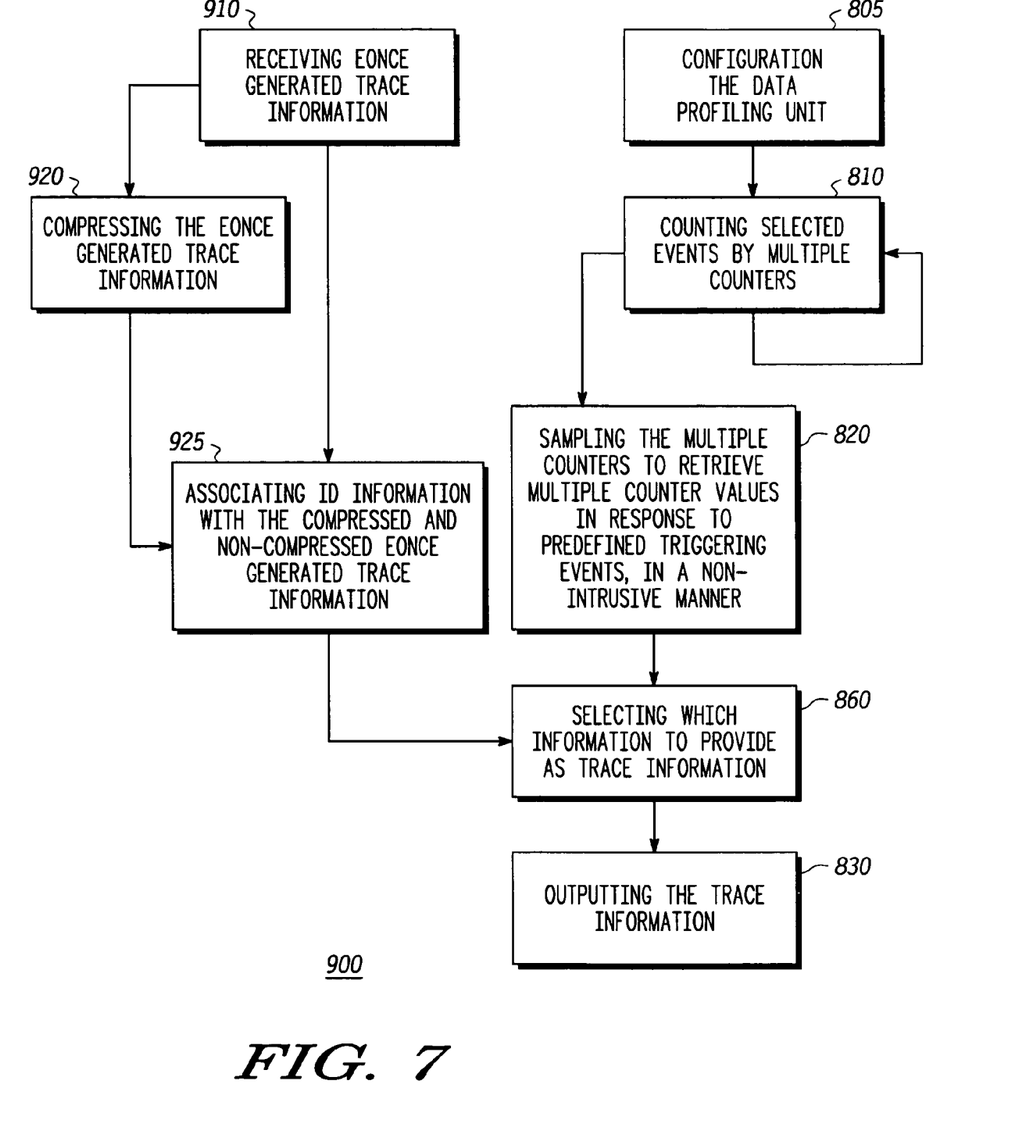

FIG. 7 is a flow chart of method 900, according to an embodiment of the invention.

Method 900 starts by stage 805 that is followed by stage 810 and 820.

In parallel to theses stages method 900 includes stage 910 of receiving additional trace information such as EOnCE generated trace information. Stage 910 is followed by stages 920 and 925. Stage 920 includes compressing that trace information. Stage 625 includes associating with the compressed or non-compressed EOnCE generated trace information an ID that can be a data ID or an information ID.

Stage 925 and 820 are followed by stage 860 of selecting which information shall be outputted as trace information. This can be only one of the three trace information types or it can be a combination of them. Conveniently, if selecting to output compressed trace information then only task ID information and not counters values can be added.

Stage 860 is followed by stage 960 of outputting the trace information. This may include writing the information to the VTB 670, via the TWB 160, and/or writing at least some of the information via the NEXUS interface 675 to the NEXUS block 504.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. An apparatus for non-intrusive tracing, the apparatus comprises:
    multiple counters, operable to count multiple selected events;
    multiple shadow registers, coupled to the multiple counters, for sampling the multiple counters in a seamless manner to provide multiple counters values, in response to triggering events;
    counters and registers logic, coupled to the multiple counters and to the multiple shadow registers, operable to control the operation of the multiple counters and multiple shadow registers; and
    trace logic, coupled to the multiple shadow registers, adapted to: (i) receive the multiple counters values and receive additional trace information that comprises at least one program counter value, and (ii) output at least one of the multiple counters values and the additional trace information.

2. The apparatus of claim 1 further comprising a trace write management unit adapted to control a writing process of trace information to a virtual trace buffer.

3. The apparatus of claim 2 further comprising a trace write buffer, for receiving trace information and for providing the trace information to the virtual trace buffer.

4. The apparatus of claim 1 further comprising a compressor adapted to compress trace information.

5. The apparatus of claim 4 wherein the compressor is adapted to compress trace information by removing trace information indicative of an occurrence of a loop.

6. The apparatus of claim 5 wherein the compressor is adapted to provide an indication of an occurrence of a loop by providing a loop flag, an indication reflecting a number of loop repetitions and a loop address.

7. The apparatus of claim 1 wherein the multiple counters are arranged in counter sets and wherein the counters and registers logic is operable to program a set of registers to track a set of events.

8. The apparatus of claim 1 further adapted to initiate interrupts in response to events.

9. The apparatus of claim 1 further adapted to provide trace information to a high-level trace information component.

10. The apparatus of claim 1 wherein at least one triggering event is a reception of predefined additional trace information.

11. The apparatus of claim 1 wherein at least one triggering event is a change of flow event.

12. The apparatus of claim 1 wherein at least one triggering event is a change in a privilege level of a traced processor.

13. The apparatus of claim 1 wherein the additional trace information further comprises a processor privilege level indication.

14. The apparatus of claim 1 wherein the additional trace information comprises trace flags.

15. The apparatus of claim 14 wherein the trace flags are selected from a group consisting of: a task flag, a supervisor task flag, a short loop flag, a long loop flag, and VTB fill flag.

16. A method for non-intrusive tracing, the method comprising:
    counting selected events by multiple counters;
    sampling in a seamless manner, by multiple shadow registers coupled to the multiple counters, the multiple counters to retrieve multiple counters values in response to predefined triggering events; wherein the multiple counters and the multiple shadow registers are controlled by a counters and registers logic circuit;
    receiving, by a trace logic coupled to the multiple shadow registers, additional trace information that comprises at least one program counter value, and
    outputting, as a trace information, by the trace logic, at least one of the multiple counters values and the additional trace information.

17. The method of claim 16 further comprising writing trace information to a virtual trace buffer.

18. The method of claim 16 further comprising compressing the additional trace information to provide compressed trace information.

19. The method of claim 18 wherein the compressing comprises removing trace information indicative of an occurrence of a loop.

20. The method of claim 18 wherein the compressing produces an indication of an occurrence of a loop that comprises a loop flag, an indication reflecting a number of loop repetitions and a loop address.

21. The method of claim 16 further comprising a preliminary stage of configuring a set of counters to count a set of events.

22. The method of claim 16 wherein at least one triggering event is a reception of predefined additional trace information.

23. The method of claim 16 wherein at least one triggering event is a change of flow event.

24. The method of claim 16 wherein at least one triggering event is a change in a privilege level of a traced processor.

25. The method of claim 16 wherein the additional trace information further comprises a processor privilege level indication.

26. The method of claim 16 wherein the additional trace information comprises trace flags.

27. The method of claim 26 wherein the trace flags are selected from a group consisting of: a task flag, a supervisor task flag, a short loop flag, a long loop flag, and VTB fill flag.

28. An apparatus for non-intrusive tracing, the apparatus comprises:
    multiple counters, operable to count multiple selected events;
    multiple shadow registers, coupled to the multiple counters, for sampling the multiple counters in a seamless manner to provide multiple counters values, in response to triggering events;

counters and registers logic, coupled to the multiple counters and to the multiple shadow registers, operable to control the operation of the multiple counters and multiple shadow registers; and trace logic, coupled to the multiple shadow registers, adapted to output at least one of the multiple counters values.

29. A method for non-intrusive tracing, the method comprising: counting selected events by multiple counters; sampling, in a seamless manner by multiple shadow registers, coupled to the multiple counters, the multiple counter to retrieve multiple counter values in response to predefined triggering events; and outputting, as a trace information by a trace logic counters to the multiple shadow registers, the multiple counters values wherein the multiple counters and the multiple shadow registers are controlled by a counters and registers logic.

* * * * *

UNITED STATES PATENT AND TRADEMARK OFFICE
CERTIFICATE OF CORRECTION

PATENT NO. : 7,249,288 B2  Page 1 of 1
APPLICATION NO. : 10/940252
DATED : September 14, 2004
INVENTOR(S) : Itay Peled et al.

It is certified that error appears in the above-identified patent and that said Letters Patent is hereby corrected as shown below:

Column 14, Line 3, Claim No. 29:
   Change "counter to retrieve" to -- counters to retrieve --

Column 14, Line 5, Claim No. 29:
   Change "trace information by" to -- trace information, by --

Column 14, Line 5, Claim No. 29:
   Change "trace logic counters" to -- trace logic coupled --

Column 14, Line 7, Claim No. 29:
   Change "values wherein" to -- values, wherein --

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,249,288 B2  Page 1 of 1
APPLICATION NO. : 10/940252
DATED : July 24, 2007
INVENTOR(S) : Itay Peled et al.

It is certified that error appears in the above-identified patent and that said Letters Patent is hereby corrected as shown below:

Column 14, Line 3, Claim No. 29:
  Change "counter to retrieve" to -- counters to retrieve --

Column 14, Line 5, Claim No. 29:
  Change "trace information by" to -- trace information, by --

Column 14, Line 5, Claim No. 29:
  Change "trace logic counters" to -- trace logic coupled --

Column 14, Line 7, Claim No. 29:
  Change "values wherein" to -- values, wherein --

This certificate supersedes the Certificate of Correction issued May 20, 2008.

Signed and Sealed this

Seventeenth Day of June, 2008

JON W. DUDAS
*Director of the United States Patent and Trademark Office*